Patented Feb. 9, 1926.

1,572,698

UNITED STATES PATENT OFFICE.

RUDOLF WIETZEL, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

MANUFACTURE AND PRODUCTION OF ALKYL ESTERS.

No Drawing.   Application filed May 20, 1925. Serial No. 31,702.

*To all whom it may concern:*

Be it known that I, RUDOLF WIETZEL, citizen of the German Empire, residing at Ludwigshafen-on-the-Rhine, Germany, have invented new and useful Improvements in the Manufacture and Production of Alkyl Esters, of which the following is a specification.

This invention relates to an improved method of preparing alkyl esters and more especially alkyl formates. Attempts have been made to produce such esters by the action of carbon monoxide on alcohols in the presence of sodium alcoholate, at room temperature, or at temperatures in the neighborhood of 200 degrees centigrade, but the quantity of ester obtained was either very small or the decomposition failed to take place.

I have now found that alkyl formates can be obtained in a very short time and with very good yields when carbon monoxide is caused to act on an alcohol at an elevated pressure and in the presence of a metal alcoholate at a moderately elevated temperature ranging between about 30 degrees and 150 degrees centigrade, the preferred range being between 60 and 100 degrees centigrade.

The process according to my present invention is more fully illustrated by the following examples which are however only typical and may be varied without departing from the scope of the invention.

Example 1.

A cylindrical steel vessel capable of withstanding pressure is supplied with methanol, containing 10 grams of sodium metal per litre in a dissolved state. The vessel is then heated to 80 degrees centigrade and carbon monoxide forced in until a pressure of 200 atmospheres is reached which is maintained by introducing additional carbon monoxide either continuously or at intervals. It is preferred to introduce the carbon monoxide by pipes reaching into the liquid content of the autoclave so as to cause the liquid to be stirred thereby. The reaction is complete after a few hours. For example when the pressure is 60 atmospheres, about three quarters of the methyl alcohol are transformed into formate after 3 hours, while with 1000 atmospheres the conversion is practically complete after a few minutes. The product which is practically pure methyl formate can either be withdrawn by a reduction valve at the bottom of the cylinder or distilled off through a valve at the top thereof. The main portion of sodium alcoholate is left behind in the autoclave in a solid state. For starting a fresh operation, methanol is then filled into the cylinder with as much sodium methylate as is necessary to compensate for losses, if there by any. As a general rule, it is preferable to purify the carbon monoxide from iron carbonyl, sulphur compounds and moisture and to protect the apparatus against an attack of carbon monoxide by employing suitable materials.

While in the absence of iron carbonyl the raw product can be obtained nearly colourless, by its presence it would be intensely coloured in consequence of undesirable secondary reactions and it would take up a certain amount of iron compound which it would be difficult to separate.

Example 2.

Ethyl alcohol either pure or denatured with toluene is distilled over quicklime in order to remove water. The dehydrated alcohol is filled in a vessel capable of withstanding pressure and lined with brass, after 1.5 per cent of sodium metal has been dissolved in the alcohol. The vessel is then supplied with carbon monoxide under a pressure of 120 atmospheres in the absence of other gases, whereupon the contents of the vessel are heated to 70 degrees centigrade. After 4 hours the reaction product is withdrawn and subjected to fractional distillation. About 90 per cent or more evaporates at 54 degrees centigrade and represents pure ethyl formate which may prove of valuable use as a solvent. The residue consists of unaltered ethyl alcohol and toluene if an addition thereof had been made.

What I claim is:

1. The process of manufacturing alkyl formates which consists in causing carbon monoxid to react on liquid alcohols in the presence of a metal alcoholate and at an elevated pressure, at temperatures ranging between about 30 and 150 degrees centigrade.

2. The process of manufacturing alkyl formates which consists in causing carbon monoxid to react on liquid alcohols in the presence of a metal alcoholate and at an elevated pressure, at temperatures ranging between about 30 and 150 degrees centigrade and avoiding the presence of iron carbonyl.

3. The process of manufacturing alkyl formates which consists in causing carbon monoxid to react on liquid alcohols in the presence of a metal alcoholate and at an elevated pressure, at temperatures ranging between about 60 and 100 degrees centigrade and avoiding the presence of iron carbonyl.

In testimony whereof I have hereunto set my hand.

RUDOLF WIETZEL.